(12) United States Patent
Briam et al.

(10) Patent No.: US 6,775,676 B1
(45) Date of Patent: Aug. 10, 2004

(54) DEFER DATASET CREATION TO IMPROVE SYSTEM MANAGEABILITY FOR A DATABASE SYSTEM

(75) Inventors: Guenter Briam, Wiesloch (DE); Namik Hrle, Boeblingen (DE); James Z. Teng, San Jose, CA (US)

(73) Assignees: International Business Machines Corporation, Armonk, NY (US); SAP Aktiengesellschaft, Walldorf (DE)

( * ) Notice: Subject to any disclaimer, the term of this patent is extended or adjusted under 35 U.S.C. 154(b) by 120 days.

(21) Appl. No.: 09/659,252

(22) Filed: Sep. 11, 2000

(51) Int. Cl.$^7$ .............................................. G06F 17/30
(52) U.S. Cl. ...................... 707/101; 707/102; 707/103; 707/104
(58) Field of Search .......................... 707/2, 4, 7, 104, 707/101, 103, 102, 202, 203, 204, 315

(56) References Cited

U.S. PATENT DOCUMENTS

| | | | |
|---|---|---|---|
| 5,555,409 A | 9/1996 | Leenstra, Sr. et al. ...... 707/101 | |
| 5,579,515 A | 11/1996 | Hintz et al. ...................... 707/7 | |
| 5,745,895 A | 4/1998 | Bingham et al. .............. 707/10 | |
| 5,778,390 A | * 7/1998 | Nelson et al. ............... 707/204 | |
| 5,835,915 A | * 11/1998 | Carr et al. .................... 707/202 | |
| 5,905,987 A | * 5/1999 | Shutt et al. .................. 707/103 | |
| 5,950,210 A | * 9/1999 | Nelson ......................... 707/203 | |
| 6,016,497 A | * 1/2000 | Suver .......................... 707/103 | |
| 6,047,284 A | * 4/2000 | Owens ............................ 707/4 | |
| 6,223,227 B1 | * 4/2001 | Williamson et al. ......... 709/315 | |
| 6,304,867 B1 | * 10/2001 | Schmidt ......................... 707/2 | |
| 6,598,037 B1 | * 7/2003 | Craig et al. ..................... 707/1 | |
| 6,662,199 B1 | * 12/2003 | Flight et al. ................. 707/100 | |

* cited by examiner

Primary Examiner—Thuy N. Pardo
(74) Attorney, Agent, or Firm—Gates & Cooper LLP (57) ABSTRACT

A defer dataset creation system creates database objects at a computer connected to a data storage device. Initially, a command to create a database object is received. A database object definition for that database object is recorded. When the database object is accessed, a dataset for the database object is created from its database object definition.

36 Claims, 4 Drawing Sheets

FIG. 1

SYSTABLES CATALOG TABLE 200

210

| DEFINE STATUS | NAME | SIZE | ... |
|---|---|---|---|
| UNDEFINED | | | |
| DEFINED | | | |
| UNDEFINED | | | |
| UNDEFINED | | | |
| DEFINED | | | |

DEFER DATASET CREATION TO IMPROVE SYSTEM MANAGEABILITY FOR A DATABASE SYSTEM

BACKGROUND OF THE INVENTION

1. Field of the Invention

This invention relates in general to computer-implemented database systems, and, in particular, to a technique for deferring dataset creation to improve system manageability for a database system.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables and each table will typically have multiple tuples and multiple columns. The tables are typically stored on direct access storage devices (DASD), such as magnetic or optical disk drives for semi-permanent storage. An index is a type of table that is used to access data in a table holding data to be accessed (e.g., employee data). To distinguish between an index or a table holding data to be accessed, a table holding data to be accessed will be referred to as a "data table". Both data tables and indexes are types of database objects that may be stored in a database.

There are many different application programs (i.e., computer programs) that use databases. An application system is one that supports many application programs on a single relational database system. Each of the supported application programs requires one or more data tables and indexes. When the application system is started, it typically creates all needed data tables and indexes in the database system for each of the supported application programs. For example, if an application system supported 3 application programs (a Human Resources application program, a Finance application program, and a Manufacturing application program) and each application program required 10,000 data tables and indexes, then the application system would create 30,000 data tables and indexes.

An Enterprise Resource Planning (ERP) system is a business management system that integrates various facets of a business, such as, human resources, finances, and manufacturing. Software systems have been developed to implement ERP systems. For example, an application system that supports various application programs (a Human Resources application program, a Finance application program, and a Manufacturing application program) may be an ERP system.

A typical ERP system may use a database that typically contains several thousand data tables and indexes. For customers that enable a few application programs on the ERP system (out of many available application programs), a major portion of the data tables and indexes are empty (i.e., the data tables and indexes for the application programs that are not enabled). For example, if a customer enabled a Manufacturing application program, without enabling the Human Resources application program or the Finance application program, the database would still be created with 30,000 data tables and indexes, which would include the 20,000 data tables and indexes for the Human Resources application program and the Finance application program, which are not needed.

Customers have no knowledge of which data tables and indexes are in-use or not in-use. Customers will still need to pay the database/storage administration (e.g. backup/recovery, DASD utilization, etc.) overheads for all data tables and indexes in the ERP system. In addition, during the ERP system installation/migration/upgrade process, all customers will need to suffer the long elapsed time delay to create/delete the underlying datasets for all data tables and indexes. The dataset creation process is the process of allocating storage from, for example, DASD. In general, the dataset creation process is a slow process. For example, it takes approximately 0.1–0.3 seconds to create a single dataset in the IBM S/390® system.

Therefore, there is a need in the art for an efficient technique for creating a database system that saves time and storage space.

SUMMARY OF THE INVENTION

To overcome the limitations in the prior art described above, and to overcome other limitations that will become apparent upon reading and understanding the present specification, the invention discloses a method, apparatus, and article of manufacture for a computer-implemented technique for deferring dataset creation to improve system manageability for a database system.

In accordance with the invention, database objects are created at a computer connected to a data storage device. Initially, a command to create a database object is received. A database object definition for that database object is recorded. When the database object is accessed, a dataset for the database object is created from its database object definition.

BRIEF DESCRIPTION OF THE DRAWINGS

Referring now to the drawings in which like reference numbers represent corresponding parts throughout.

DETAILED DESCRIPTION

In the following description of embodiments of the invention, reference is made to the accompanying drawings which form a part hereof, and which is shown by way of illustration specific embodiments in which the invention may be practiced. It is to be understood that other embodiments may be utilized as structural changes may be made without departing from the scope of the invention.

Hardware Environment

Figure 1:
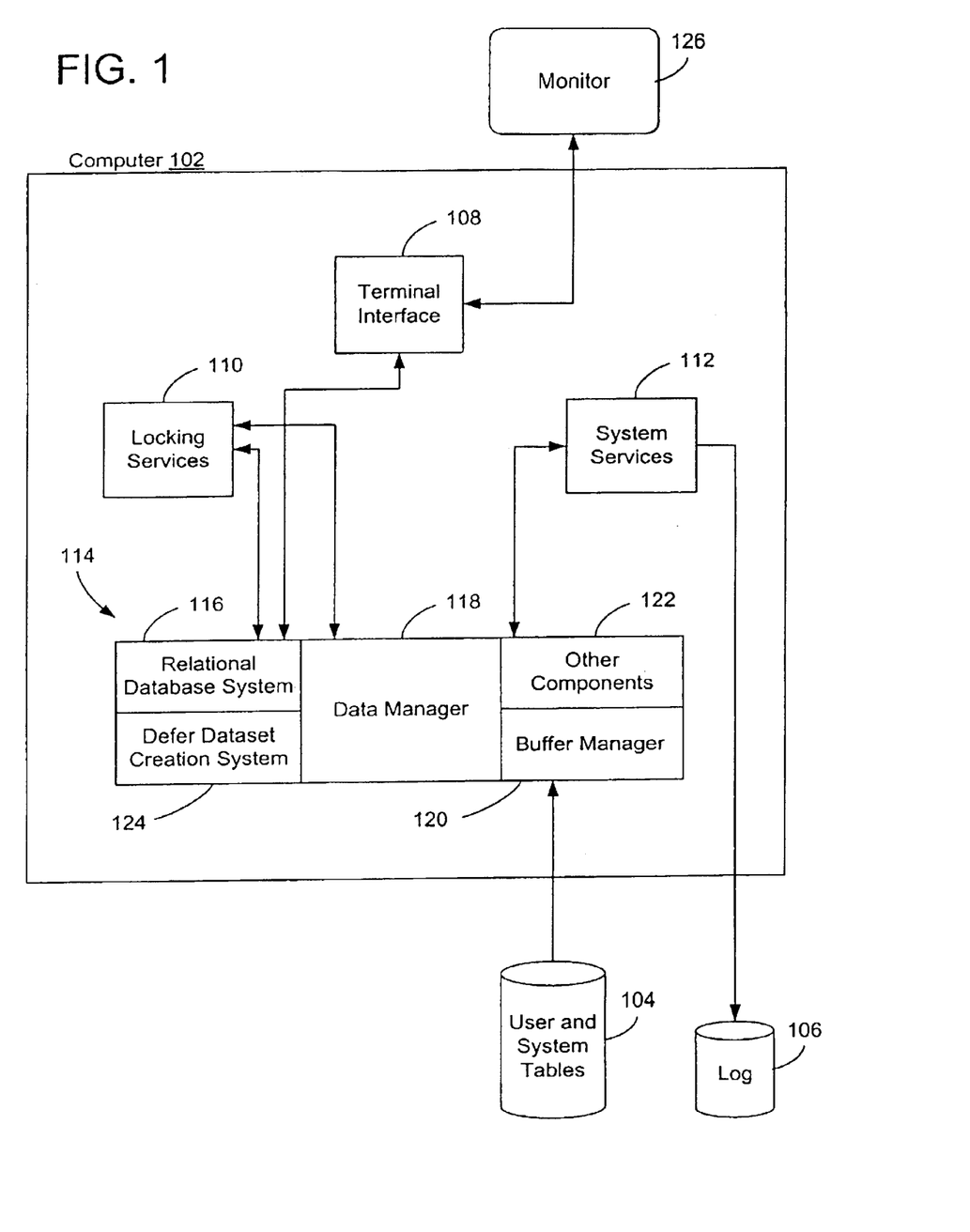
FIG. 1 illustrates an exemplary computer hardware environment that could be used in accordance with the invention.

FIG. 1 illustrates an exemplary computer hardware environment that could be used in accordance with the invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108 to transmit electrical signals to and from the computer system 102 that represent commands for performing various search and retrieval functions, termed queries, against the databases. In embodiment of the invention, these queries conform to the Structured Query Language (SQL) standard, and invoke functions performed by a data management component that supports transactions (i.e., units of work; one application program may perform several transactions), such as Relational DataBase Management System (RDBMS) software. The SQL interface has evolved into a standard language for RDBMS software and has been adopted as such by both the American National Standards Institute (ANSI) and the International Standards Organization (ISO). The SQL interface allows users to formulate relational operations on the data tables either interactively, in batch files, or embedded in host languages, such as C and COBOL. SQL allows the user to manipulate the data.

In one embodiment of the invention, a data management component that supports transactions comprises the DB2® product offered by IBM for the OS/390@ operating systems. Those skilled in the art will recognize, however, that the invention has application to any RDBMS software, whether or not the RDBMS software uses SQL.

As illustrated in FIG. 1, the DB2® system for the OS/390® operating system includes three major components: the Internal Resource Lock Manager (IRLM) 110, the Systems Services module 112, and the Database Services module 114. The IRLM 110 handles locking services for the DB2® system, which treats data as a shared resource, thereby allowing any number of users to access the same data simultaneously. Thus concurrency control is required to isolate users and to maintain data integrity. The Systems Services module 112 controls the overall DB2® execution environment, including managing log data sets 106, gathering statistics, handling startup and shutdown, and providing management support.

At the center of the DB2® system is the Database Services module 114. The Database Services module 114 contains several submodules, including the Relational Database System (RDS) 116, the Data Manager 118, the Buffer Manager 120, the Defer Dataset Creation System 124, and other components 122 such as an SQL compiler/interpreter. These submodules support the functions of the SQL language, i.e. definition, access control, interpretation, compilation, database retrieval, and update of user and system data. The Defer Dataset Creation System 124 works in conjunction with the other submodules to rebalance partitioned data.

The invention is generally implemented using SQL statements executed under the control of the Database Services module 114. The Database Services module 114 retrieves or receives the SQL statements, wherein the SQL statements are generally stored in a text file on the data storage devices 104 and 106 or are interactively entered into the computer system 102 by an operator sitting at a monitor 126 via operator interface 108. The Database Services module 114 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104 and 106. Moreover, the RDBMS software, the SQL statements, and the instructions derived therefrom, are all comprised of instructions which, when read and executed by the computer system 102, causes the computer system 102 to perform the steps necessary to implement and/or use the invention. Under control of an operating system, the RDBMS software, the SQL statements, and the instructions derived therefrom, may be loaded from the data storage devices 104 and 106 into a memory of the computer system 102 for use during actual operations.

Thus, the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the invention.

Those skilled in the art will recognize that the exemplary environment illustrated in FIG. 1 is not intended to limit the invention. Indeed, those skilled in the art will recognize that other alternative hardware environments may be used without departing from the scope of the invention.

Deferring Dataset Creation

One embodiment of the invention provides a Defer Dataset Creation System 124. For an application system, such as a ERP system, the Defer Dataset Creation System 124 defers creation of the underlying datasets of data tables and indexes for application programs. Instead, the Defer Dataset Creation System 124 writes data table and index definitions for the data tables and indexes into a database catalog. Then, the Defer Dataset Creation System 124 creates datasets for a particular data table or index when data is to be inserted into the particular data table or index (i.e., when the first record is inserted into a data table or index).

In particular, when a user is about to create a data table, the user may use the following syntax to indicate whether dataset creation is to be deferred or whether the data table is to be created with its datasets initially:

| CREATE TABLE | <table-name> |
|---|---|
| | < |
| | <column definition list> |
| | DEFINE <no or yes> |
| | ...> |

The above syntax is provided for illustration only. One skilled in the art would recognize that other syntax may be used without departing from the scope of the invention. In particular, the keyword DEFINE may be replaced with another keyword, such as DEFERDC (for defer dataset creation). In the above syntax, a user uses keywords CREATE TABLE followed by a table name and column list. A user enters DEFINE NO to defer dataset creation and enters DEFINE YES not to defer dataset creation. If a user does not submit a DEFINE clause in a CREATE TABLE statement, in one embodiment, the Defer Dataset Creation System 124 sets DEFINE to YES as a default. The ellipses indicate that other clauses or commands may be included in the statement.

A user may create an employee table with columns for employee name, address, and social security number and defer dataset creation with the following sample SQL statement:

CREATE TABLE emp (name varchar, address varchar, socsec int) DEFINE NO;

In particular, when a user is about to create an index, the user may use the following syntax to indicate whether dataset creation is to be deferred or whether the index is to be created with its datasets initially:

| | |
|---|---|
| CREATE INDEX | <index-name> ON <table-name> <index-column definition list> DEFINE <no or yes> ... |

The above syntax is provided for illustration only. One skilled in the art would recognize that other syntax may be used without departing from the scope of the invention. In particular, the keyword DEFINE may be replaced with another keyword. In the above syntax, a user uses keywords CREATE INDEX followed by an index name, a data table name for which to create the index, and an index-column list that defines the list of columns in the index. A user enters DEFINE NO to defer dataset creation and enters DEFINE YES not to defer dataset creation. If a user does not submit a DEFINE clause in a CREATE INDEX statement, in one embodiment, the Defer Dataset Creation System 124 sets DEFINE to YES as a default. The ellipses indicate that other clauses or commands may be included in the statement.

A user may create an employee index on the emp table with a column for a social security number and defer dataset creation with the following sample SQL statement:

CREATE INDEX empindex on emp (socsec int) DEFINE NO;

In an alternative embodiment, the DEFINE clause may apply to a partition or other portion of a database, rather than to a table or index.

Thus, at the time a data table or index is created in the database system, a user specifies a DEFINE YES or DEFINE NO option on the CREATE TABLE/INDEX SQL statements. If the DEFINE NO option is specified, then the Defer Dataset Creation System 124 will register all the data table and index schema definitions in the database catalog without creating underlying datasets for any data table or index, until a first record is inserted into the data table or index. The Defer Dataset Creation System 124 will also record the undefined status for those undefined data tables and indexes in the database catalog. The database catalog status may be queried by users to determine the DEFINE status of a data table or index.

A database catalog is an example of a system database and is a collection of catalog tables. A catalog table of the database catalog may be accessed by both the system and end users. A database catalog is a collection of tables that contain descriptions and definitions of database objects (e.g., data tables and indexes). Each catalog table may serve as a directory for the location of database objects and related data which is needed by application programs or transactions.

When, for example, an application process or a transaction invoked by a user requests a table, the transaction refers to a catalog table for information relating to that particular table. In order to access the contents of the catalog table, the transaction obtains a lock on the catalog table. In other words, the catalog table may be "checked out" by the transaction. The transaction, through a DDL statement, may place a lock on the catalog table. Locks may be non-exclusive or exclusive and are used to maintain the integrity of data within catalog tables.

Figure 2:
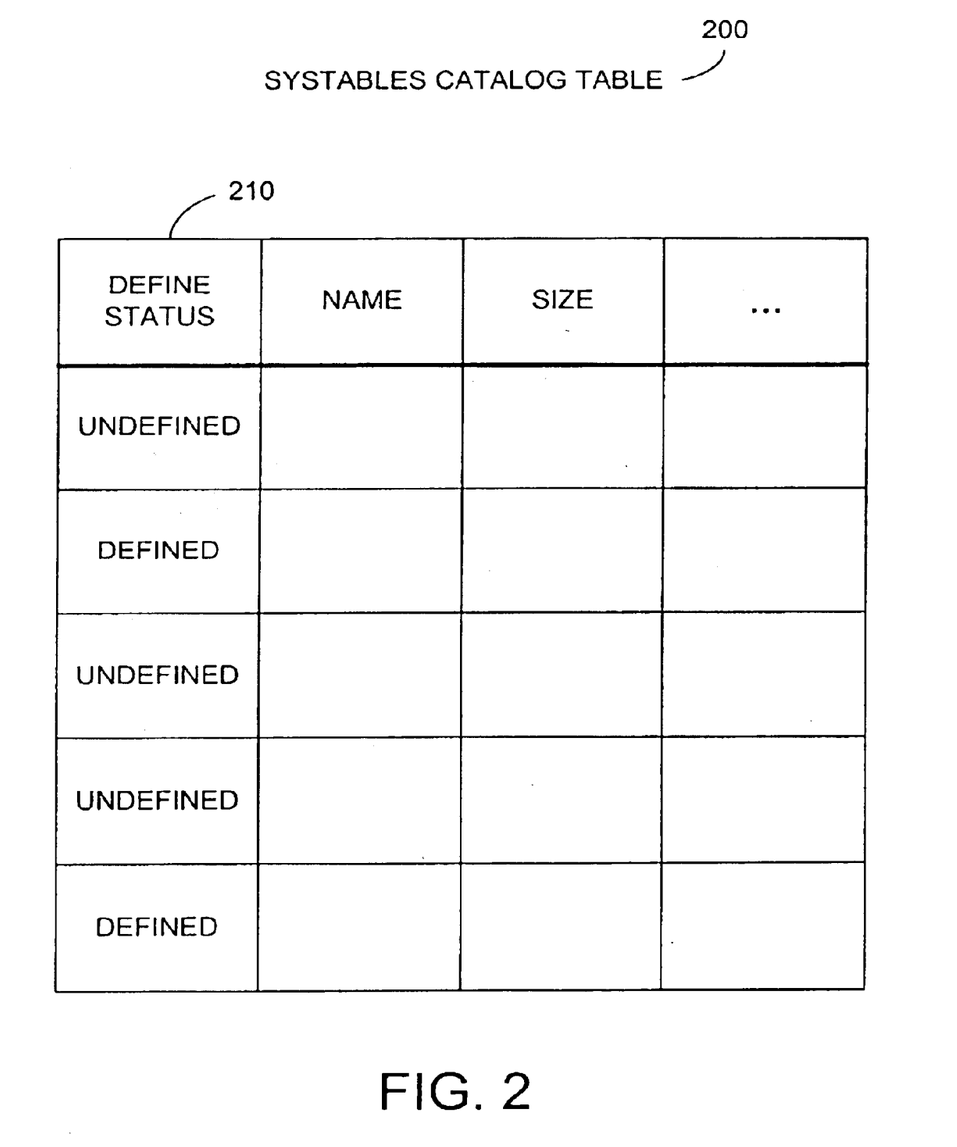
FIG. 2 is a diagram illustrating a sample catalog table.

FIG. 2 is a diagram illustrating a sample catalog table 200. In one embodiment, the DEFINE status 210 is recorded in a column of a SYSTABLES catalog table. The SYSTEABLES catalog table describes tables, views, and aliases and contains one row for each table, view, and alias. The tables, views, and aliases may be for data tables or indexes. The DEFINE status column 210 entries indicate whether datasets are to be created prior to data being added to a data table or index. For illustration, the keywords DEFINED (i.e., indicate that datasets were created) and UNDEFINED (i.e., to indicate that dataset creation is deferred until data is to be entered) have been entered into the DEFINE status column 210.

When a record is first inserted into a data table or index that is in an UNDEFINED state, the Defer Dataset Creation System 124 creates the underlying datasets. Additionally, at this time, the Defer Dataset Creation System 124 changes the database catalog status for that data table or index to a DEFINED state. For a database system that supports a database LOAD utility, the first insert to a data table or index could either be a LOAD or a SQL INSERT operation.

For example, if an application system supported 3 application programs (a Human Resources application program, a Finance application program, and a Manufacturing application program) and each application program required 10,000 data tables and indexes, then a conventional system would create 30,000 data tables and indexes. With the Defer Dataset Creation System 124, data tables and indexes may be defined with the DEFINE clause. In this case, if only a Manufacturing application program was enabled, without enabling the Human Resources application program or the Finance application program, the Defer Dataset Creation System 124 would create at most the 10,000 data tables and indexes required for the Manufacturing application program, and it would create these only as needed (i.e., when data is to be inserted/loaded into the data tables and indexes). Thus, the Defer Dataset Creation System 124 leads to more efficient use of disk storage and time (i.e., time to create datasets, etc.). The Defer Dataset Creation System 124 is also advantageous in that fewer data tables and indexes require less management (e.g., backup and recovery is faster as it operates on less data).

Figure 3:
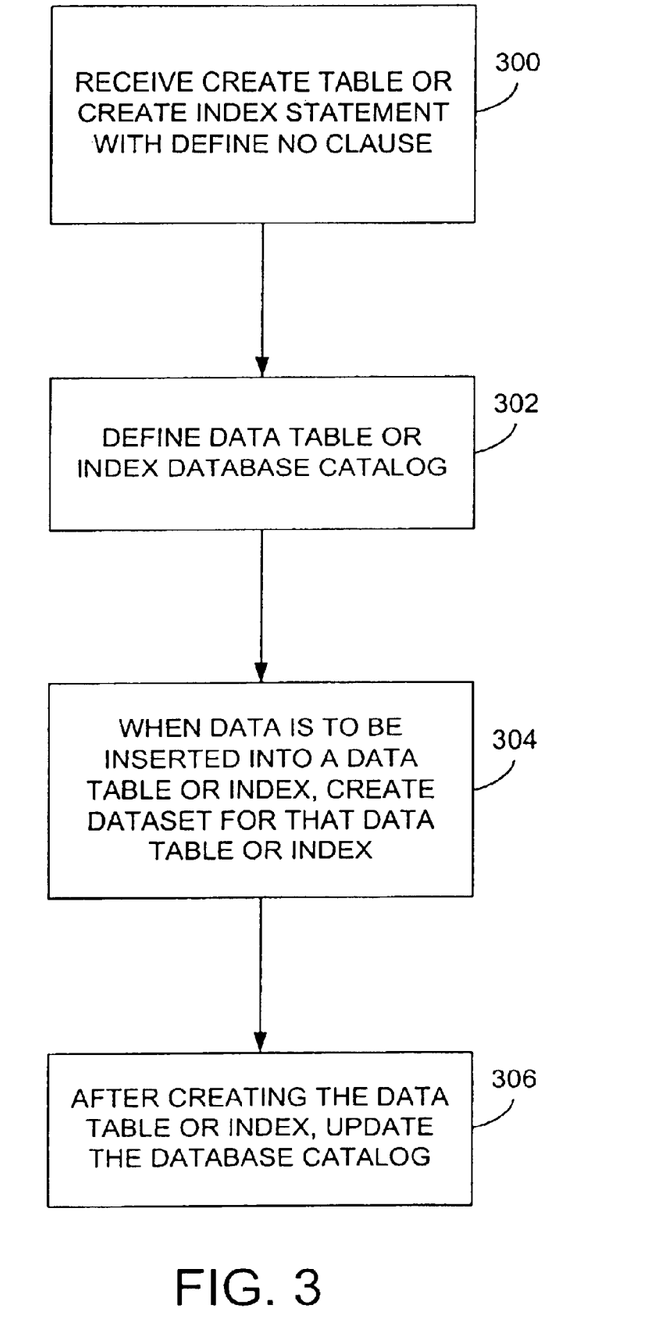
FIG. 3 is a flow diagram illustrating a process performed by the Defer Dataset Creation System.

FIG. 3 is a flow diagram illustrating a process performed by the Defer Dataset Creation System 124. In block 300, the Defer Dataset Creation System 124 receives a create table or create index statement with a DEFINE NO clause. In block 302, the Defer Dataset Creation System 124 defines a data table or an index in a database catalog. In block 304, when data is to be inserted into a data table or an index, the Defer Dataset Creation System 124 creates a dataset for that data table or index. In block 306, after creating the data table or index, the Defer Dataset Creation System 124 updates the database catalog with a DEFINE status in one embodiment.

In one embodiment, the Defer Dataset Creation System 124 treats the undefined data tables or indexes as logically empty data tables or indexes. For example, if the undefined data tables or indexes are accessed for an operation, including, without limitation, SELECT, UPDATE, or DELETE, the Defer Dataset Creation System 124 does not create the underlying datasets for the undefined tables or indexes. Instead, the Defer Dataset Creation System 124 returns an indication that the database object may not be modified. In one embodiment, the Defer Dataset Creation System 124 informs the application program or transaction (i.e., a unit of work; one application program may perform several transactions) that requested the operation that the row was not found (e.g., via a SQL "Row Not Found" return code).

In one embodiment, the LOAD utility is the only database utility allowed to be run against an undefined data table. For other database utilities (such as REORG, COPY, RECOVER, RUNSTATS, etc.), if operations are submitted against an undefined data table, the Defer Dataset Creation System 124, in one embodiment, returns an indication that the database may not be modified. In particular, the Defer Dataset Creation System issues an informational message indicating that the database utility was not run and ignores the requested operation.

In another embodiment, if a database utility is run against a set of defined and undefined data tables, the Defer Dataset Creation System 124 runs the requested utility against the defined data tables only, while ignoring the undefined data tables.

In yet another embodiment, if a database utility is run against a set of defined and undefined data tables, the Defer Dataset Creation System 124 provides a user with the opportunity to decide whether to define the undefined data tables, defines any undefined data tables that the user requested be defined, and then runs the requested utility against the defined tables.

Figure 4:
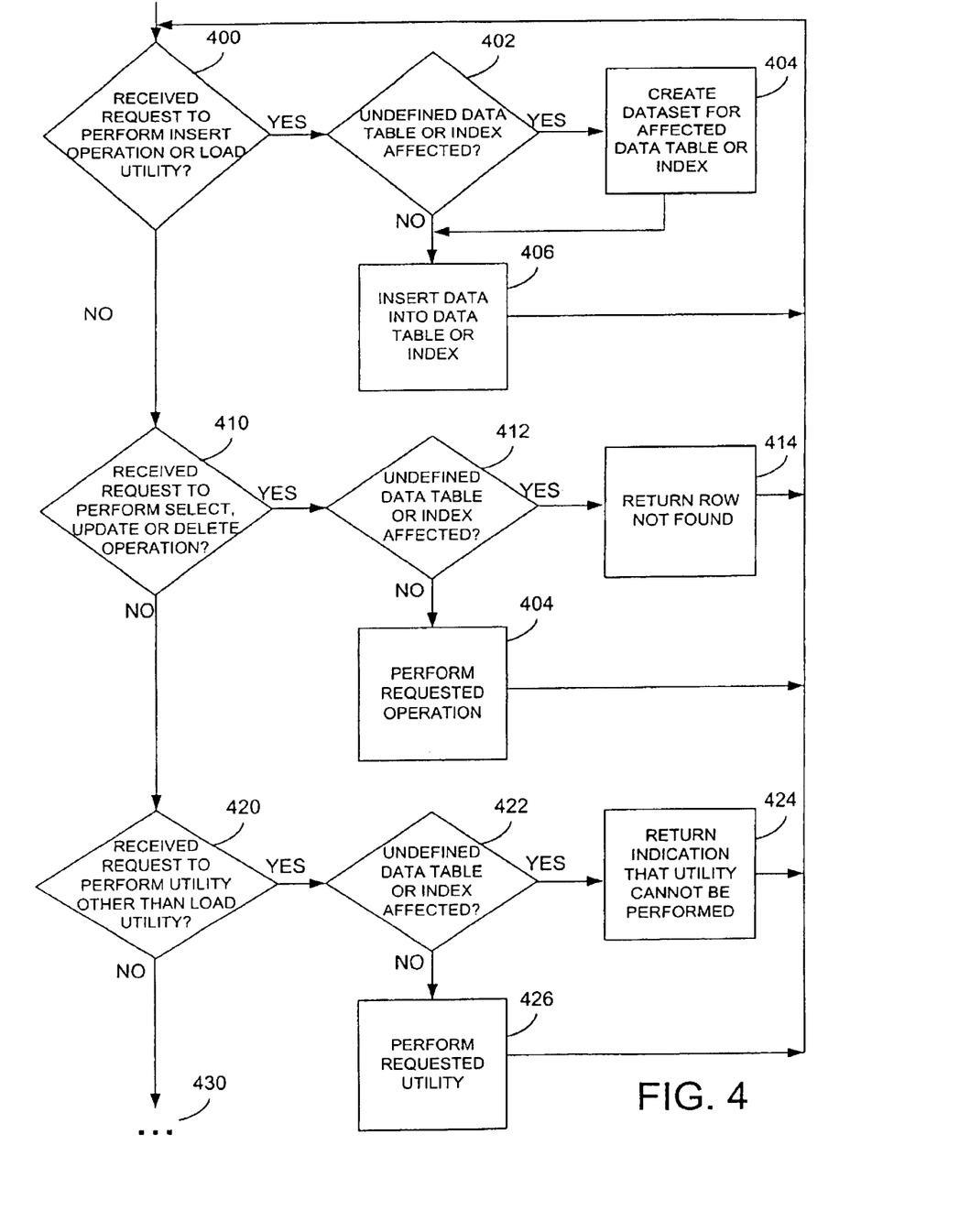
FIG. 4 is a flow diagram illustrating a process performed by the Defer Dataset Creation System in one embodiment.

FIG. 4 is a flow diagram illustrating a process performed by the Defer Dataset Creation System 124 in one embodiment. In block 400, the Defer Dataset Creation System 124 determines whether a request to perform an INSERT operation or a LOAD utility has been received. If so, the Defer Dataset Creation System 124 continues to block 402, otherwise, the Defer Dataset Creation System 124 continues to block 410. In block 402, the Defer Dataset Creation System 124 determines whether an undefined data table or index is affected. If so, the Defer Dataset Creation System 124 continues to block 404, otherwise, the Defer Dataset Creation System 124 continues to block 406. In block 404, the Defer Dataset Creation System 124 creates an underlying dataset for the affected data table or index. In block 406, the Defer Dataset Creation System 124 inserts data into the data table or index.

In block 410, the Defer Dataset Creation System 124 determines whether a request to perform a SELECT, UPDATE, or DELETE operation has been received. If so, the Defer Dataset Creation System 124 continues to block 412, otherwise, the Defer Dataset Creation System 124 continues to block 420. In block 412, the Defer Dataset Creation System 124 determines whether an undefined data table or index is affected. If so, the Defer Dataset Creation System 124 continues to block 414, otherwise, the Defer Dataset Creation System 124 continues to block 416. In block 414, the Defer Dataset Creation System 124 returns a row not found message. In block 416, the Defer Dataset Creation System 124 performs the requested operation.

In block 420, the Defer Dataset Creation System 124 determines whether a request to perform a utility (other than LOAD) has been received. If so, the Defer Dataset Creation System 124 continues to block 422, otherwise, the Defer Dataset Creation System 124 continues to block 430. In block 422, the Defer Dataset Creation System 124 determines whether an undefined data table or index is affected. If so, the Defer Dataset Creation System 124 continues to block 424, otherwise, the Defer Dataset Creation System 124 continues to block 426. In block 424, the Defer Dataset Creation System 124 returns an indication that the utility can not be performed. In block 426, the Defer Dataset Creation System 124 performs (i.e., runs) the requested utility.

The ellipses illustrated as block 430 are depicted to represent that other processing may occur. It is to be understood that FIG. 4 illustrates processing in one embodiment. In other embodiments, the request to perform a utility other than a LOAD utility may be processed in a different manner, as discussed above with respect to alternative embodiments.

Conclusion

This concludes descriptions of embodiments of the invention. The following describes some alternative embodiments for accomplishing the technique of the invention. For example, any type of computer, such as a mainframe, minicomputer, or personal computer, or computer configuration, such as the Internet, a local area network, or wide area network, could be used with the invention.

The foregoing description of embodiments of the invention have been presented for the purposes of illustration and description. They are not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of creating database objects at a computer connected to a data storage device, comprising:

receiving a command to create a database object in a database management system, wherein the database object comprises one or more tables or indexes; and deferring creation of the database object in the database management system by recording a database object definition for the database object in a catalog of the database management system and, only when data is inserted in the database object, creating a dataset for the database object in the database management system from the database object definition.

2. The method of claim 1, further comprising recording the database object definition in the catalog along with an indication of whether the database object is defined.

3. The method of claim 2, further comprising accessing the catalog to obtain the indication of whether the database object is defined.

4. The method of claim 2, further comprising, after defining the database object, updating the catalog to indicate that the database object has been defined.

5. The method of claim 1, wherein the database object is defined when a request to insert data into the database object is received.

6. The method of claim 1, wherein the database object is defined when a request to load data into the database object is received.

7. The method of claim 1, further comprising: receiving a request to access a database object that has not been defined; and returning an indication that the database object may not be modified.

8. The method of claim 7, wherein the request to access comprises a SELECT command, or an UPDATE command, or a DELETE command.

9. The method of claim 7, wherein the indication comprises a row not found return code.

10. The method of claim 1, further comprising:

receiving a request to modify the database, comprising defined and undefined database objects; and modifying the database by modifying the defined database objects.

11. The method of claim 1, further comprising:

receiving a request to modify the database, comprising defined and undefined database objects; and returning the indication that the database may not be modified.

12. The method of 1, further comprising:

receiving a request to modify the database, comprising defined and undefined database objects;

providing a user with the opportunity to define the undefined database objects;

defining any undefined database objects that the user requested be defined; and modifying the database by modifying the defined database objects.

13. An apparatus for creating database objects, comprising: a computer connected to a data storage device that stores the database objects;

one or more computer programs, performed by the computer, for receiving a command to create a database object in a database management system, wherein the database object comprises one or more tables or indexes, and deferring creation of the database object in the database management system by recording a database object definition for the database object in a catalog of the database management system and, only when data is inserted in the database object, creating a dataset for the database object in the database management system from the database object definition.

14. The apparatus of claim 13, further comprising recording the database object definition in the catalog along with an indication of whether the database object is defined.

15. The apparatus of claim 14, further comprising accessing the catalog to obtain the indication of whether the database object is defined.

16. The apparatus of claim 14, further comprising, after defining the database object, updating the catalog to indicate that the database object bas been defined.

17. The apparatus of claim 13, wherein the database object is defined when a request to insert data into the database object is received.

18. The apparatus of claim 13, wherein the database object is defined when a request to load data into the database object is received.

19. The apparatus of claim 13, further comprising: receiving a request to access a database object that has not been defined; and returning an indication that the database object may not be modified.

20. The apparatus of claim 19, wherein the request to access comprises a SELECT command, or an UPDATE command, or a DELETE command.

21. The apparatus of claim 19, wherein the indication comprises a row not found return code.

22. The apparatus of claim 13, further comprising:

receiving a request to modify the database, comprising defined and undefined database objects; and modifying the database by modifying the defined database objects.

23. The apparatus of claim 13, further comprising:

receiving a request to modify the database, comprising defined and undefined database objects; and returning an indication that the database may not be modified.

24. The apparatus of claim 13, further comprising:

receiving a request to modify the database, comprising defined and undefined database objects;

providing a user with the opportunity to define the undefined database object;

defining any undefined database objects that the user requested be defined; and modifying the database by modifying the defined database objects.

25. An article of manufacture comprising a computer program caner readable by computers and embodying one or more instructions executable by the computer for creating database objects stored in a data storage device connected to the computer, comprising:

receiving a command to create a database object in a database management system, wherein the database object comprises one or more tables or indexes; and deferring creation of the database object in the database management system by recording a database object definition for the database object in a catalog of the database management system and only when data is inserted in the database object, creating a dataset for the database object in the database management system from the database object definition.

26. The article of manufacture of claim 25, further comprising recording the database object definition in the catalog along with an indication of whether the database object is defined.

27. The article of manufacture of claim 26, further comprising accessing the catalog to obtain the indication of whether the database object is defined.

28. The article of manufacture of claim 26, further comprising, after defining the database object, updating the catalog to indicate that the database object has been defined.

29. The article of manufacture of claim 25, wherein the database object is defined when a request to insert data into the database object is received.

30. The article of manufacture of claim 25, wherein the database object is defined when a request to load data into the database object is received.

31. The article of manufacture of claim 25, further comprising: receiving a request to access a database object that has not been defined; and returning an indication that the database object may not be modified.

32. The article of manufacture of claim 31, wherein the request to access comprises a SELECT command, or an UPDATE command, or a DELETE command.

33. The article of manufacture of claim 31, wherein the indication comprises a row not found return code.

34. The article of manufacture of claim 25, further comprising:

receiving a request to modify the database, comprising defined and undefined database objects; and modifying the database by modifying the defined database objects.

35. The article of manufacture of claim 25, further comprising:

receiving a request to modify the database, comprising defined and undefined database objects; and returning an indication that the database may not be modified.

36. The article of manufacture of claim 25, further comprising:

receiving a request to modify the database, comprising defined and undefined database objects;

providing a user with the opportunity to define the undefined database objects;

defining any undefined database objects that the user requested be defined; and modifying the database by modifying the defined database objects.

* * * * *

UNITED STATES PATENT AND TRADEMARK OFFICE
CERTIFICATE OF CORRECTION

PATENT NO.    : 6,775,676 B1
DATED         : August 10, 2004
INVENTOR(S)   : Guenter Briam et al.

It is certified that error appears in the above-identified patent and that said Letters Patent is hereby corrected as shown below:

Column 9,
Line 59, "object;" should read -- objects; --.

Column 10,
Line 2, "caner" should read -- carrier --.

Signed and Sealed this

Twenty-sixth Day of October, 2004

JON W. DUDAS
*Director of the United States Patent and Trademark Office*